US012772966B1

(12) United States Patent
Kelley et al.

(10) Patent No.: US 12,772,966 B1
(45) Date of Patent: Oct. 27, 2026

(54) TACKLE STICK FISHING POLE WITH BUILT-IN TACKLE STORAGE COMPARTMENTS

(71) Applicants: Christian Susanne Kelley, Dayton, TX (US); Donnie Joe Kelley, Dayton, TX (US)

(72) Inventors: Christian Susanne Kelley, Dayton, TX (US); Donnie Joe Kelley, Dayton, TX (US)

( * ) Notice: Subject to any disclaimer, the term of this patent is extended or adjusted under 35 U.S.C. 154(b) by 67 days.

(21) Appl. No.: 19/328,104

(22) Filed: Sep. 13, 2025

Related U.S. Application Data

(63) Continuation-in-part of application No. 19/291,350, filed on Aug. 5, 2025.

(51) Int. Cl.

| | |
|---|---|
| ***A01K 97/06*** | (2006.01) |
| ***A01K 87/00*** | (2006.01) |
| ***A01K 87/08*** | (2006.01) |

(52) U.S. Cl.
CPC .......... *A01K 87/009* (2022.02); *A01K 87/007* (2013.01); *A01K 87/08* (2013.01); *A01K 97/06* (2013.01)

(58) Field of Classification Search
CPC .. A01K 87/009; A01K 87/007; A01K 87/008; A01K 87/00; A01K 87/08; A01K 91/02; A01K 97/06; B65D 21/0201; B65D 21/0204; A61H 2003/002; A61H 2003/003; B25G 1/08; B25G 1/085
USPC ................. 43/25.2, 25, 18.1 R, 23, 19, 54.1; 30/125; 206/499, 503, 315.11; 220/23.2, 220/23.4, 23.6, 23.8, 23.83, 23.86, 23.87, 220/23.88, 23.89; 224/920; 7/106; 16/111.1; 135/65, 66
See application file for complete search history.

(56) References Cited

U.S. PATENT DOCUMENTS 10,795 A * 4/1854 De Saxe .................. A45B 3/00 43/18.1 R
475,852 A * 5/1892 Edgerly .................. A45B 3/00 43/18.1 R (Continued)

FOREIGN PATENT DOCUMENTS

CN 104335986 A * 2/2015 ........... A01K 87/007
CN 205233231 U * 5/2016

(Continued)

*Primary Examiner* — Darren W Ark

(57) ABSTRACT

A fishing rod having a handle with integrated tackle storage. In one form, snap-fit lids in the handle provide direct access to individual receptacles. In another, a removable cartridge slides within a cavity of the handle and is accessible through a base cap; internal partitions organize hooks, sinkers, and lures. A further embodiment provides a spring-loaded cartridge retained by a flush-mounted push-button latch that releases the cartridge to an extended position while a travel stop prevents ejection. The cartridge includes a catch point for latch engagement. Another embodiment provides a twist-to-open system in which a rotatable cylinder carrying multiple compartments is indexed to align a selected compartment with a sealed access opening, with detents and a lock to resist unwanted rotation. These structures improve convenience, waterproofing, and ergonomic balance while eliminating the need for a separate tackle box.

4 Claims, 4 Drawing Sheets

(56) References Cited

U.S. PATENT DOCUMENTS

| | | | | | | |
|---|---|---|---|---|---|---|
| 706,225 | A | * | 8/1902 | Ekelund | A45B 3/00 | 43/18.1 R |
| 723,260 | A | * | 3/1903 | Freh | A45B 3/14 | 135/66 |
| 1,252,632 | A | * | 1/1918 | Voje | A45B 3/00 | 473/44 |
| 1,318,085 | A | * | 10/1919 | Kee | F41B 15/02 | 43/25 |
| 1,324,554 | A | * | 12/1919 | Kozlowski | A45B 3/00 | 43/18.1 CT |
| 1,398,717 | A | * | 11/1921 | Gillette | A01K 89/006 | 43/23 |
| 1,550,080 | A | * | 8/1925 | Lehrritter | A01K 87/00 | 43/25.2 |
| 2,138,190 | A | * | 11/1938 | Myers | A01K 97/06 | 312/307 |
| 2,232,621 | A | * | 2/1941 | Merie | A01K 97/06 | 43/57.1 |
| 2,241,183 | A | * | 5/1941 | Ceder | A01K 97/10 | 43/23 |
| 2,465,744 | A | * | 3/1949 | Olender | A01K 87/00 | 43/23 |
| 2,486,163 | A | * | 10/1949 | Jennings | A01K 77/00 | 43/11 |
| 2,667,009 | A | * | 1/1954 | Bear | A01K 97/06 | 220/345.2 |
| 2,723,403 | A | * | 11/1955 | Miller | A01K 95/02 | 72/332 |
| 2,750,184 | A | * | 6/1956 | Warndahl | A01K 87/08 | D22/139 |
| 2,765,687 | A | * | 10/1956 | Stanfield | A01K 97/18 | 43/53.5 |
| 2,783,875 | A | * | 3/1957 | Shabarick | A01K 97/06 | 206/315.11 |
| 2,806,229 | A | * | 9/1957 | Pletz | A01K 95/02 | 30/186 |
| 2,808,043 | A | * | 10/1957 | Lombard | A01K 89/08 | 242/224 |
| 2,814,152 | A | * | 11/1957 | Trujillo | A01K 97/06 | 43/57.1 |
| 2,830,399 | A | * | 4/1958 | Joseph | A01K 97/06 | 43/57.1 |
| 2,834,139 | A | * | 5/1958 | Needham | A01K 77/00 | D22/139 |
| 2,879,591 | A | * | 3/1959 | Bennett | B26B 11/00 | 43/43.1 |
| 2,914,881 | A | * | 12/1959 | Williams | A01K 97/00 | 43/23 |
| 2,931,125 | A | * | 4/1960 | Planin | A01K 97/18 | 43/53.5 |
| 3,026,644 | A | * | 3/1962 | Raider | A01K 91/02 | 43/19 |
| 3,057,464 | A | * | 10/1962 | Baggott, Sr. | A01K 97/06 | 206/820 |
| 3,093,402 | A | * | 6/1963 | Sisson | A45B 3/00 | 135/65 |
| 3,154,063 | A | * | 10/1964 | White | F41B 3/02 | 43/43.11 |
| 3,172,319 | A | * | 3/1965 | Stanfield | A01K 95/02 | 7/106 |
| 3,302,320 | A | * | 2/1967 | Breeden | B65H 75/406 | 242/387 |
| 3,378,134 | A | * | 4/1968 | Wilkinson | A01K 97/06 | 206/315.11 |
| 3,524,571 | A | * | 8/1970 | Geiger | A01K 97/06 | 224/920 |
| 3,760,438 | A | * | 9/1973 | White | B26B 11/006 | 30/151 |
| 3,803,742 | A | * | 4/1974 | Foster | A01K 97/14 | 43/6 |
| 3,929,223 | A | * | 12/1975 | Ludeman | B25F 1/00 | 206/374 |
| 3,987,574 | A | * | 10/1976 | Pennino | A01K 97/06 | 43/26 |
| 4,020,581 | A | * | 5/1977 | Genovese | A01K 87/002 | 43/18.5 |
| 4,027,419 | A | * | 6/1977 | Popeil | A01K 87/00 | 43/18.1 CT |
| 4,048,743 | A | * | 9/1977 | Lapinski | A01K 97/125 | 43/18.1 R |
| 4,049,165 | A | * | 9/1977 | Goldhaft | A01K 97/06 | 43/23 |
| 4,084,343 | A | * | 4/1978 | Genovese | A01K 87/06 | 43/22 |
| 4,209,931 | A | * | 7/1980 | Vance | A01K 87/06 | 43/22 |
| 4,366,641 | A | * | 1/1983 | Price | A01K 97/06 | 224/920 |
| 4,381,059 | A | * | 4/1983 | Schurman | A61J 7/04 | 206/533 |
| 4,467,548 | A | * | 8/1984 | Tabor | A01K 97/06 | D22/142 |
| 4,563,834 | A | * | 1/1986 | Spencer | A01K 97/06 | 43/57.1 |
| 4,619,066 | A | * | 10/1986 | Kirkland | A01K 87/00 | 43/25 |
| 4,700,502 | A | * | 10/1987 | McFarland | A01K 97/10 | 206/315.11 |
| 4,727,609 | A | * | 3/1988 | Smith, Jr. | B25F 1/02 | 7/170 |
| 4,744,614 | A | * | 5/1988 | Gombosi | A01K 97/04 | 220/345.5 |
| 4,780,980 | A | * | 11/1988 | McCullough | A01K 87/08 | 43/18.1 R |
| 4,858,365 | A | * | 8/1989 | Struntz | A01K 87/08 | 43/22 |
| 4,862,635 | A | * | 9/1989 | Conte | A01K 97/06 | 242/405 |
| 4,869,011 | A | * | 9/1989 | Whiting | A01K 87/08 | 43/23 |
| 5,136,744 | A | * | 8/1992 | Allsop | A01K 97/00 | 407/29.15 |
| 5,207,012 | A | * | 5/1993 | Lael | A01K 97/00 | 7/106 |
| 5,297,676 | A | * | 3/1994 | Coleman | A01K 97/06 | 206/315.11 |
| 5,517,885 | A | * | 5/1996 | Feng | B25G 1/085 | 81/439 |
| 5,645,954 | A | * | 7/1997 | Tamaru | H01M 50/213 | 429/100 |
| 5,722,445 | A | * | 3/1998 | Hae | A45B 3/04 | 135/65 |
| 5,950,346 | A | * | 9/1999 | da Rosa | A01K 97/08 | 43/25 |
| 6,125,489 | A | * | 10/2000 | Zeller | B26B 11/00 | 7/106 |
| 6,971,203 | B1 | * | 12/2005 | Foor | A01K 87/025 | 43/19 |
| 7,013,516 | B1 | * | 3/2006 | Peters | B25G 1/08 | 7/164 |
| 7,210,264 | B1 | * | 5/2007 | Demetris | A01K 97/24 | 43/25 |
| 7,798,330 | B2 | * | 9/2010 | Noble | B65D 83/04 | 206/533 |
| 8,381,339 | B2 | * | 2/2013 | Knapp | B26B 3/00 | 7/158 |
| 9,226,555 | B1 | * | 1/2016 | Shyu | A45B 9/02 | |
| 9,907,299 | B2 | * | 3/2018 | Lincoln | A01K 87/007 | |
| 10,149,464 | B2 | * | 12/2018 | Free | A01K 97/06 | |
| 12,245,578 | B2 | * | 3/2025 | Moffett | A01K 97/06 | |
| 2002/0079313 | A1 | * | 6/2002 | Grayson | A01K 97/06 | 43/57.1 |
| 2005/0066779 | A1 | * | 3/2005 | Huang | B25G 1/043 | 81/177.2 |
| 2012/0138492 | A1 | * | 6/2012 | Gruber | B42F 7/14 | 206/499 |

(56) References Cited

U.S. PATENT DOCUMENTS

| | | | | |
|---|---|---|---|---|
| 2022/0305636 | A1* | 9/2022 | Liu | B25B 23/0035 |
| 2023/0211475 | A1* | 7/2023 | Chen | B25G 1/085 81/177.4 |
| 2025/0121486 | A1* | 4/2025 | Chen | B25G 1/085 |

FOREIGN PATENT DOCUMENTS

| | | | | |
|---|---|---|---|---|
| CN | 208875164 | U | * | 5/2019 |
| CN | 208875165 | U | * | 5/2019 |
| CN | 208875166 | U | * | 5/2019 |
| CN | 208875167 | U | * | 5/2019 |
| CN | 211153429 | U | * | 8/2020 |
| CN | 212414401 | U | * | 1/2021 |
| CN | 212589735 | U | * | 2/2021 |
| CN | 212589739 | U | * | 2/2021 |
| CN | 213961410 | U | * | 8/2021 |
| CN | 216219650 | U | * | 4/2022 |
| CN | 217609065 | U | * | 10/2022 |
| JP | H09113 | A | * | 1/1997 |
| JP | 2008245567 | A | * | 10/2008 |
| JP | 2021141840 | A | * | 9/2021 |

* cited by examiner

TACKLE STICK FISHING POLE WITH BUILT-IN TACKLE STORAGE COMPARTMENTS

CROSS-REFERENCE TO RELATED APPLICATIONS

This application is a Continuation-in-Part of U.S. Non-Provisional patent application Ser. No. 19/291,350, filed Aug. 5, 2025, titled "Tackle Stick Fishing Pole with Built-In Tackle Storage Compartments." The entirety of that application is incorporated herein by reference.

FIELD OF THE INVENTION

The present invention relates generally to fishing equipment, and more particularly to fishing pole with integrated storage compartments for tackle, weights, hooks, bait, and related accessories.

BACKGROUND OF THE INVENTION

Traditional fishing requires anglers to carry tackle boxes or pouches separately from their fishing rods, which creates inefficiencies and inconvenience when accessing small components such as hooks, sinkers, and lures. Prior attempts to integrate storage features into fishing rods have suffered from drawbacks such as bulkiness, limited capacity, lack of ergonomic balance, or mechanisms that interfere with casting and retrieval.

The parent invention addressed these limitations by integrating streamlined, accessible storage compartments directly into the fishing rod handle while maintaining ergonomic balance and performance. However, continued development has revealed opportunities to further improve functionality, waterproofing, and one-handed usability. This Continuation-in-Part introduces additional embodiments to enhance convenience, safety, and durability.

SUMMARY OF THE INVENTION

The invention provides a fishing rod with a handle that incorporates one or more storage compartments for fishing tackle. These compartments allow anglers to store and access hooks, sinkers, lures, and bait without requiring a separate tackle box.

This CIP introduces two new embodiments:

(a) Spring-Loaded Cartridge Release (FIG. 3C)

A push-button flush-mounted in the handle releases a spring-biased cartridge.

The cartridge extends partially outward for one-handed access.

A stop feature prevents accidental ejection.

Divider compartments organize tackle securely.

A catch point engages with the latch for controlled release.

(b) Twist-to-Open Rotating Compartment System (FIG. 4)

A rotatable cylinder inside the handle contains multiple compartments.

Twisting the handle aligns a selected compartment with a waterproof access opening.

Detents and a locking mechanism prevent unwanted movement.

This system enhances waterproof sealing and organized storage.

Together with the parent embodiments (snap-lid compartments and slide-out cartridge with threaded cap), these designs provide a versatile family of solutions for on-the-water tackle management.

DETAILED DESCRIPTION OF THE INVENTION

General Structure

Figure 1:
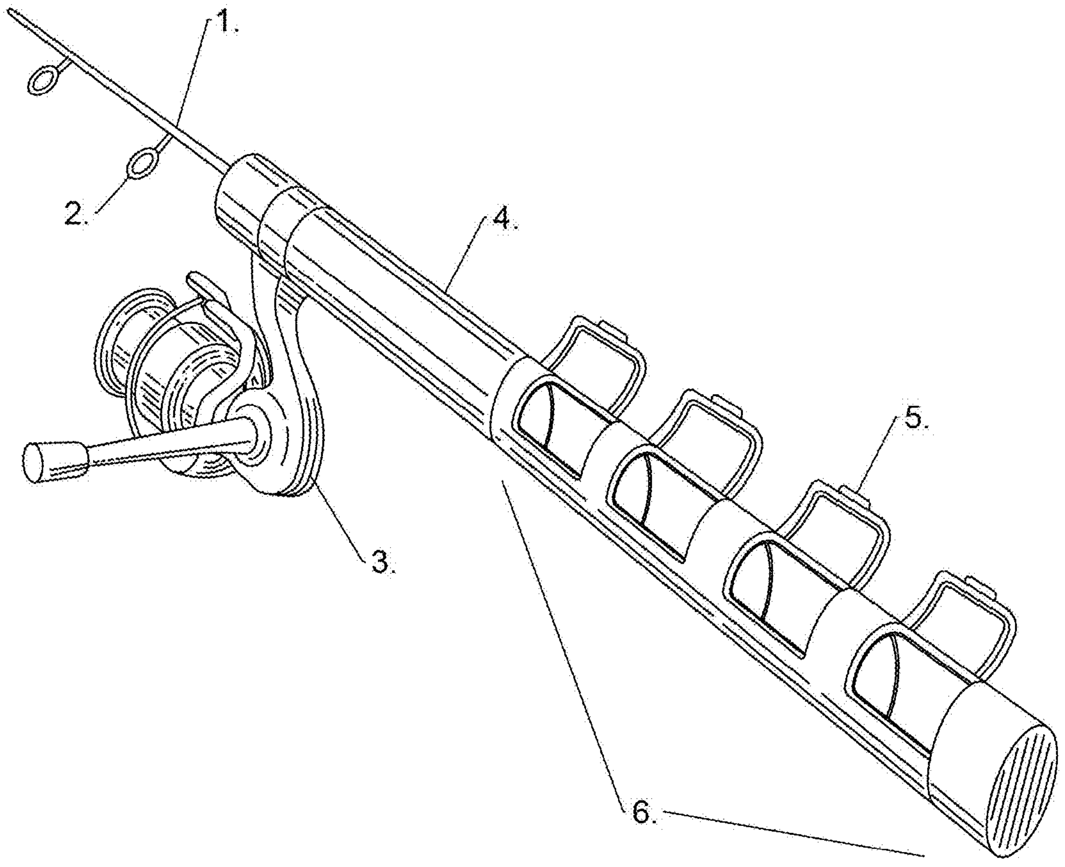
FIG. 1: Perspective view of a fishing rod with snap-lid compartments (5) integrated into the handle (4), showing stored tackle (6).
Figure 2:
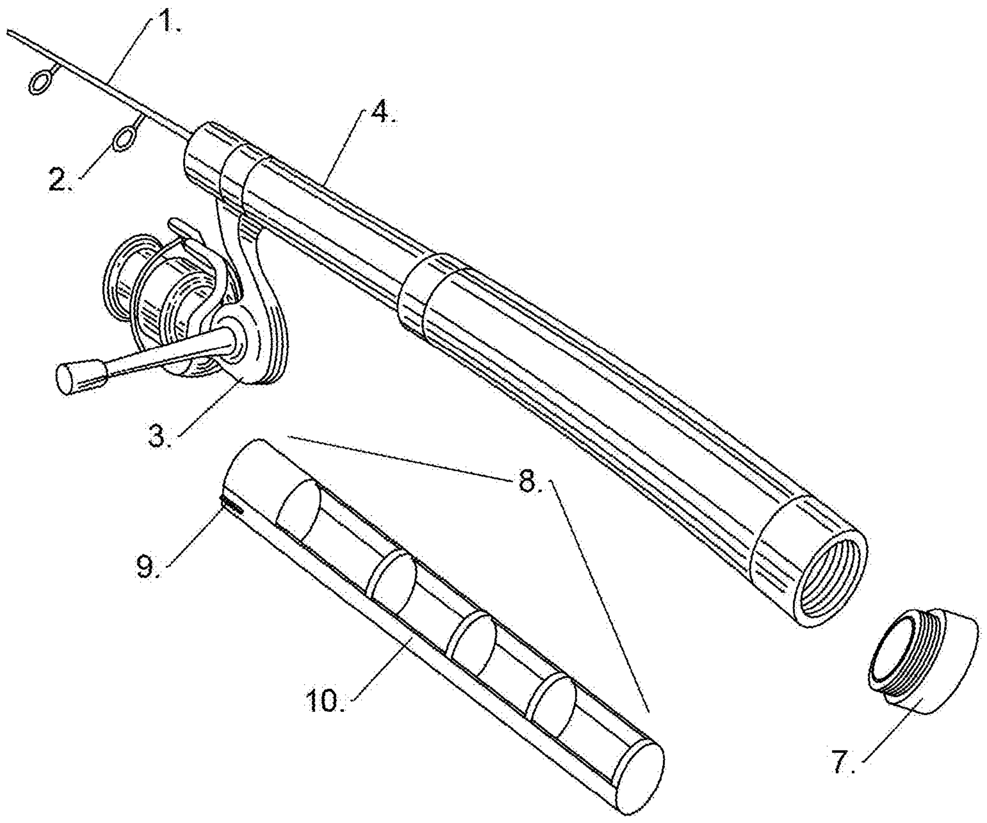
FIG. 2: Perspective view of an alternate embodiment with a slide-out cylindrical cartridge (8), threaded base cap (7), internal stopper (9), and divider compartments (10).
Figure 3A:
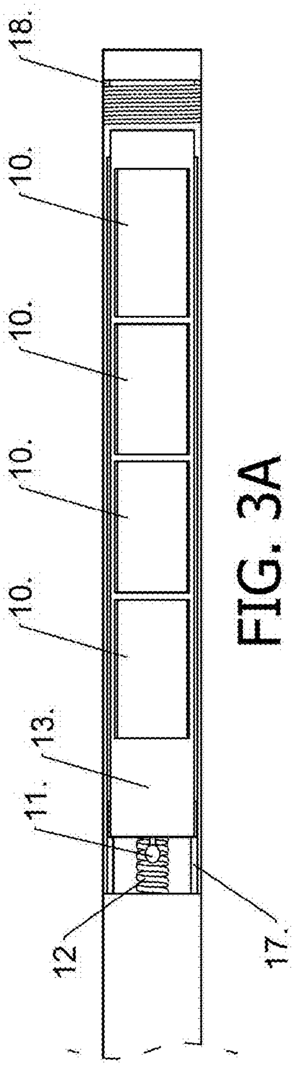
FIG. 3A: Illustrates the spring-loaded cartridge (13) in its fully inserted position in the cavity of the handle.
Figure 3B:
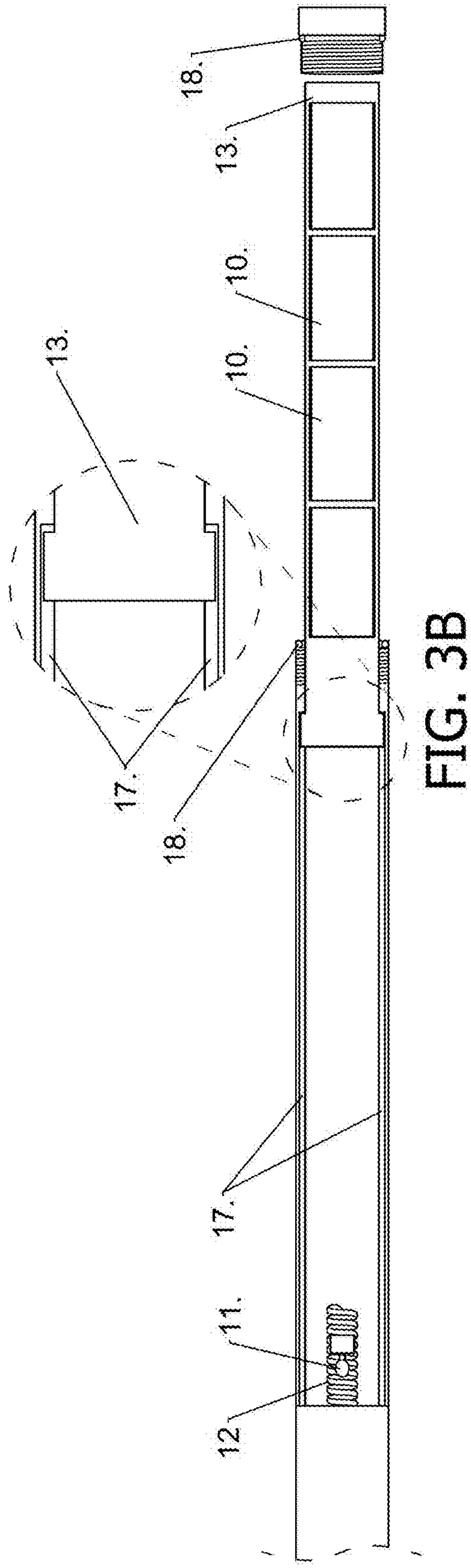
FIG. 3B: Illustrates the spring-loaded cartridge (13) in its extended position.
Figure 3C:
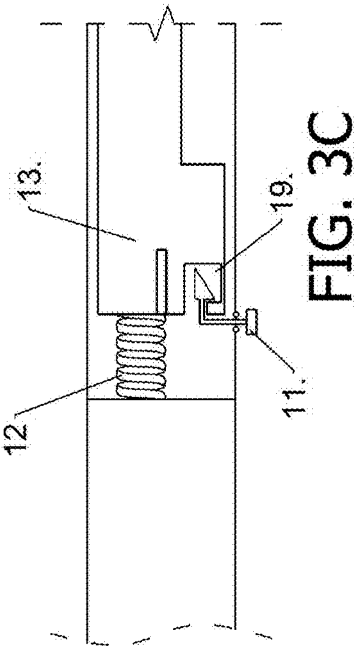
FIG. 3C: Illustrates a close-up view of the push-button release (11), spring element (12), cartridge (13), and cartridge catch point (19) and how specifically the push-button release (11) interacts with the cartridge catch point (19) to retain the cartridge (13) in the fully inserted position.

The fishing rod comprises a rod shaft (1) with conventional line guide eyelets (2) and a reel (3) mounted to a handle (4). The handle integrates tackle storage features without compromising ergonomic grip or balance. The handle may be formed from fiberglass, composite, plastic, carbon fiber, or other durable lightweight materials.

Embodiment One: Snap-Lid Compartments (Parent)

The handle includes multiple compartments, each sealed by a snap-fit lid (5). Lids are flush with the surface to maintain grip comfort and may include gaskets for waterproofing.

Embodiment Two: Slide-Out Cartridge with Base Cap (Parent)

A cylindrical cartridge (8) fits within a hollow chamber of the handle. The cartridge is removable via a threaded or snap-fit end cap (7). Divider compartments (10) organize tackle, while internal stoppers (9) prevent unintended release.

Embodiment Three: Spring-Loaded Cartridge Release (New Matter)

A spring-biased cartridge (13) resides in the handle cavity. A flush push-button (11) operates a latch with a catch hook, holding the cartridge closed until pressed. The cartridge (13) includes a catch point (19) configured to engage with the latch. When depressed, the button disengages the catch, allowing the spring (12) to extend the cartridge outward until limited by an internal guide rail (17). The guide rail extends along the interior of the cavity, stabilizing the cartridge and ensuring alignment with the latch and push-button release. Divider compartments (10) organize stored tackle. A gasket (18) may provide sealing around the opening.

Embodiment Four: Twist-to-Open Rotating Compartment System (New Matter)

Figure 4:
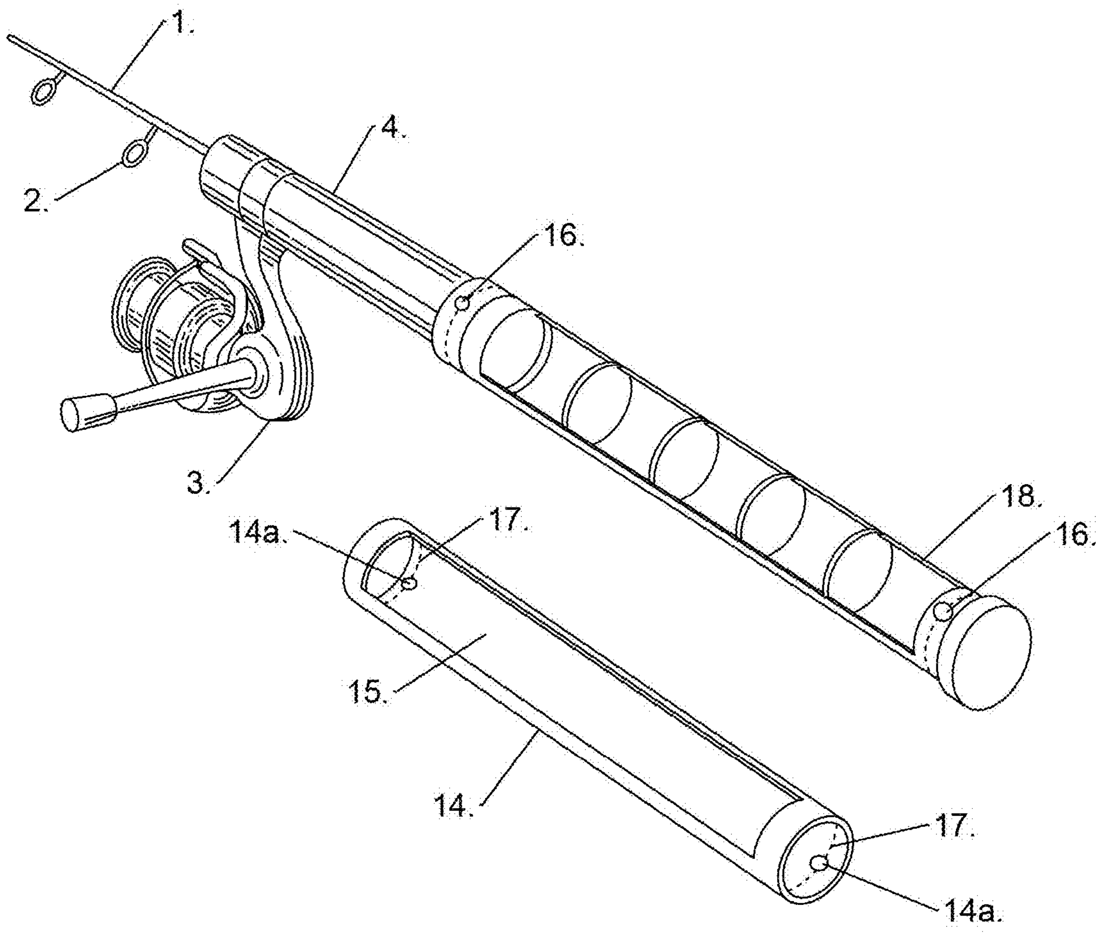
FIG. 4: Perspective view of twist-to-open rotating compartment system, showing rotating cylinder (14), access opening (15), locking mechanism (16), gasket seal (18), and internal guide rails (17) for alignment. A detent (**14*a*) is shown in greater detail, representing the feature previously identified as detent (14**).

A rotatable cylinder (14) is housed within the handle. Twisting the outer portion indexes the cylinder so that a chosen compartment aligns with access opening (15). Detents (14*a*) may be positioned along the rotation track to index discrete alignment positions, as shown in FIG. 4. The detent 14*a* corresponds to the same feature previously identified as detent 14, now illustrated in greater detail to indicate its positioning and engagement with the end cap (18). Internal guide rails (17) may engage grooves on the cylinder to maintain alignment and stability. A locking mechanism (16) secures the cylinder during casting. A gasket (18) around the access opening ensures waterproofing. The cylinder may be removable for cleaning or replacement.

Materials and Manufacturing

All embodiments may be manufactured via injection molding, machining, composite layup, or 3D printing. Seals, gaskets, or liners may enhance waterproofing. Compartments may be varied in size for different tackle types.

REFERENCE NUMERALS

1—Rod shaft (main body)
2—Line guide eyelets
3—Reel
4—Handle
5—Snap-open lids
6—Stored tackle
7—Threaded base cap
8—Cylindrical cartridge insert
9—Internal stopper
10—Divider compartments inside insert
11—Push-button release
12—Spring element
13—Spring-loaded cartridge
14—Rotating internal cylinder
14*a*—Detailed view of detent
15—Access opening
16—Locking mechanism
17—Internal guide rail/travel stop
18—Waterproof gasket/seal
19—Cartridge catch point

The invention claimed is:

1. A fishing rod comprising:
a rod shaft;
a hollow handle portion fixedly secured to the rod shaft and defining an elongated internal storage cavity extending longitudinally therein;
a cartridge positioned within the internal storage cavity, the cartridge including a plurality of divider compartments configured to organize fishing tackle;
a compression spring disposed within the internal storage cavity between an interior wall of the handle portion and a proximal end of the cartridge, the compression spring configured to bias the cartridge in an outward longitudinal direction from the elongated internal storage cavity;
a latch mechanism mounted within the handle portion and including a catch structure configured to engage a corresponding catch point formed on the cartridge to retain the cartridge in a fully inserted position;
a user-actuatable push-button mounted flush within an exterior surface of the handle portion and operatively coupled to the latch mechanism;
a travel-limiting retention structure comprising an internal guide rail extending longitudinally along an interior surface of the handle portion within the internal storage cavity;
wherein actuation of the push-button disengages the latch mechanism from the catch point to permit the compression spring to drive the cartridge outward from the fully inserted position toward an extended position; and
wherein outward longitudinal movement of the cartridge is mechanically limited by engagement between lateral protrusions of the cartridge and terminal end portions of the internal guide rail to define a retained access position in which a portion of the cartridge projects outward from the handle portion for manual grasping, thereby preventing complete ejection of the cartridge from the handle portion while permitting controlled partial extension.

2. The fishing rod of claim 1, wherein the retained access position exposes a length of the cartridge to permit one-handed manual grasping of the cartridge while the cartridge remains mechanically retained within the handle portion by the internal guide rail.

3. The fishing rod of claim 1, wherein the internal guide rail is positioned to mechanically block the further outward longitudinal movement of the cartridge beyond the retained access position.

4. The fishing rod of claim 1, wherein the cartridge remains continuously mechanically retained within the handle portion by the internal guide rail while accessing during using access to fishing tackle stored within the divider compartments.

* * * * *